(12) United States Patent
Kattwinkel

(10) Patent No.: US 8,121,058 B2
(45) Date of Patent: Feb. 21, 2012

(54) COGNITIVE IP RADIO WITH REPEATERS

(75) Inventor: Bryan Kattwinkel, Palm Bay, FL (US)

(73) Assignee: Investors Life Insurance Corporation, Greenwich, CT (US)

( * ) Notice: Subject to any disclaimer, the term of this patent is extended or adjusted under 35 U.S.C. 154(b) by 220 days.

(21) Appl. No.: 12/400,422

(22) Filed: Mar. 9, 2009

(65) Prior Publication Data

US 2009/0190508 A1    Jul. 30, 2009

Related U.S. Application Data

(63) Continuation-in-part of application No. 12/172,124, filed on Jul. 11, 2008, which is a continuation-in-part of application No. 10/730,753, filed on Dec. 8, 2003, now Pat. No. 7,457,295.

(60) Provisional application No. 60/432,223, filed on Dec. 10, 2002.

(51) Int. Cl.
*H04L 5/14* (2006.01)

(52) U.S. Cl. ........ 370/274; 370/279; 370/293; 370/296; 370/328; 370/338; 370/492; 370/501

(58) Field of Classification Search .................... None
See application file for complete search history.

(56) References Cited

U.S. PATENT DOCUMENTS

| | | | | |
|---|---|---|---|---|
| 5,978,364 | A  * | 11/1999 | Melnik | 370/320 |
| 2005/0135399 | A1* | 6/2005 | Baden et al. | 370/428 |
| 2006/0274792 | A1* | 12/2006 | Abhishek et al. | 370/913 |
| 2006/0285510 | A1* | 12/2006 | Kim et al. | 370/312 |
| 2007/0059098 | A1* | 3/2007 | Mayfield et al. | 404/84.5 |
| 2008/0225931 | A1* | 9/2008 | Proctor et al. | 375/214 |
| 2009/0111376 | A1* | 4/2009 | Kim et al. | 455/9 |
| 2010/0245085 | A1* | 9/2010 | Mochizuki et al. | 340/540 |

* cited by examiner

*Primary Examiner* — Anthony Sol
(74) *Attorney, Agent, or Firm* — Feldman Gale, P.A.; Michael C. Cesarano

(57) ABSTRACT

An operational mechanism enables extending the range of cognitive networks through the use of repeater transceivers and selective routing.

24 Claims, 5 Drawing Sheets

COGNITIVE IP RADIO WITH REPEATERS

CROSS REFERENCE TO RELATED APPLICATIONS

This application is a continuation-in-part of U.S. patent application Ser. No. 12/172,124, filed Jul. 11, 2008 which is a continuation-in-part of U.S. patent application Ser. No. 10/730,753, filed Dec. 8, 2003 (now U.S. Pat. No. 7,457,295) which claims priority to U.S. Patent Application No. 60/432,223 filed Dec. 10, 2002.

FIELD OF THE INVENTION

The present invention relates in general to communication systems and subsystems thereof, and is particularly directed to a 'repeater' embodiment that may be employed by the communications controller of a spectral reuse transceiver of a communication system of the type disclosed in the above-identified '124 application, to enable spectral-reuse methods in transceivers having many of the benefits of the communication system disclosed in the '124 application, extending the communications range of the cognitive network.

BACKGROUND OF THE INVENTION

As described in the '124 application (and its incorporated references), in some radio bands, such as the 217 220 MHz VHF band, as a non-limiting example, governmental licensing agencies (e.g., the Federal Communications Commission (FCC)) customarily grant primary licensees non exclusive use of the band for a variety of communication services, such as push to talk voice transmission. Primary users pay for this licensed use with an expectation that they will not encounter interference by other users. The FCC also allows secondary users to access the same band and the same channels within the band on a 'non-interfering' or secondary basis, whereby a channel may be used by a secondary, non-licensed, user, so long as the primary user is not using that channel.

The FCC and similar agencies in foreign countries are continually looking for ways to allow the expanded use of these licensed radio frequency bands without reducing the quality of service available to primary users. For secondary users, these bands provide a cost free opportunity with excellent radio transmission properties for telemetry and other applications. Because secondary users must not interfere with primary users, however, complaints of interference from a primary user to the FCC may result in its issuing an administrative order requiring the secondary user to move to another portion of the band or leave the band entirely. Such a spectral transition is disruptive to the secondary user's service and can be expensive, especially if site visits, equipment modification, or exchange are required in order to implement the mandated change. It will be appreciated, therefore, that there is a need for a mechanism that allows a secondary user to employ a licensed band on a non interfering basis and that will adapt the radio's frequency usage should new primary users appear. It should be noted that primary users always have priority over secondary users and there is no first use channel frequency right for secondary users.

Advantageously, the invention described in the '753 application incorporated into the '124 application successfully addresses this need by means of a monitored spectral activity-based link utilization control mechanism, and the present application extends the range of the transceiver links through 'repeatering'. Briefly reviewing this link utilization control mechanism, which may be used with a star-configured communication system among other topologies and configurations, such as that depicted in the reduced complexity diagram of FIG. 1, a spectral reuse transceiver installed at a master site 10 communicates with respective spectral reuse transceivers installed at a plurality of remote sites 12. Each spectral reuse transceiver operates with a selectively filtered form of frequency hopping for producing a sub-set of non interfering radio channels or 'sub-channels'. It should be noted here that other configuration or network topologies may be used consistent with the invention disclosed herein. Thus the invention may be used with radio links between transceivers in other topologies, such as point-to-point, and individual links in mesh networks without limitation, consistent herewith.

For this purpose, the master site 10 periodically initiates a clear sub-channel assessment routine, in which the master site and each of the remote sites 12 participate, in order to compile or 'harvest' a list of non-interfering or 'clear' sub-channels (such as 6.25 KHz wide sub-channels), which may be used by participants of the network for conducting communication sessions that do not ostensibly interfere with any licensed user. By transmitting on only clear sub-channels, a respective site's spectral reuse transceiver is ensured that it will not interfere with any primary user of the band of interest.

Except when it is transmitting a message to the master site, each remote user site sequentially steps through and monitors a current list of clear sub-channels (that it has previously obtained from the master site), in accordance with a pseudo-random (PN) hopping sequence that is known a priori by all the users of the network, listening for a message that may be transmitted to it by the master site transceiver. During the preamble period of any message transmitted by the master site, each remote site's transceiver scans all frequency bins within a given spectrum for the presence of radio frequency (RF) energy. Any bin containing energy above a prescribed threshold is marked as a non-clear sub-channel, while the remaining sub-channels are identified as clear (and therefore available for reuse) sub-channels.

Whenever a remote site notices a change in its clear sub-channel assessment, it reports this to the master site at the first opportunity. As the master site has received clear sub-channel lists from all the remote sites, it logically combines all of the clear sub-channel lists, to produce a composite clear sub-channel list. This composite clear sub-channel list is stored in the master site's transceiver and is broadcast to all of the remote sites over a prescribed one of the clear sub-channels that is selected in accordance with a PN sequence through which clear sub-channels are selectively used among the users of the network. When the composite clear sub-channel list is received at a respective remote site it is stored in the site's transceiver.

To ensure that all communications among the users of the network are properly synchronized (in terms of the composite clear sub-channel list and the order through which the units traverse, or 'hop' through, the clear sub-channel entries of the clear sub-channel list), the master site's transceiver transmits an initialization message on an a priori established clear sub-channel, which each of the remote units monitors. This initialization message contains the clear sub-channel list, an identification of the preamble channel, a PN sequence tap list, and a PN seed that defines the initial sub-channel and hopping sequence for the duration of an upcoming transmit burst. Once a remote site has received an initialization message, that site will transition to normal multiple access mode.

This procedure is similar to that disclosed in the '124 application which is intended for use with a star-configured communication system such as that depicted in the reduced complexity diagram of FIG. 1 in which a spectral reuse transceiver installed at a master site 10 communicates with respective spectral reuse transceivers installed at a plurality of remote sites 12. Each spectral reuse transceiver operates with a selectively filtered form of frequency hopping for producing a sub-set of non interfering radio channels or 'sub-channels'.

For further details of the architecture and operation of the spectral reuse link control mechanism disclosed in the above-referenced '753 and '124 applications, attention may be directed to those documents. They will not be detailed here in order to focus the present description on the problem of simplex and duplex 'repeater' embodiments, whereby one or more remote site transceivers operate in repeater mode to extend the range of the network.

SUMMARY OF THE INVENTION

In accordance with the present invention, the simplex cognitive 'repeater' goal is successfully addressed by designating one or more transceivers in the cognitive network to perform the repeater function, prescribing one or more lists of distant transceivers being served by repeaters in a distant network, prescribing a set of routing rules for the repeaters, including rules for routing messages received from distant transceivers and rules for routing messages received from the base station or other transceivers in the network, and prescribing a set of rules to enable distant transceivers to participate in the cognitive aspects of the network.

In another embodiment of the present invention, the network and one or more distant networks each operate on independent frequencies ('duplex mode'), wherein the local network and any far networks are independent cognitive networks. The cognitive 'duplex repeater' goal is successfully addressed by designating one or more transceivers in the cognitive network to perform the repeater function, prescribing one or more lists of distant transceivers being served by repeaters in a distant network, interconnecting each repeater transceiver to the distant network's respective base station transceiver, prescribing a set of routing rules for the repeaters, including rules for routing messages received from distant transceivers and rules for routing messages received from the base station or other transceivers in the network, and prescribing a set of rules to enable distant transceivers to participate in the cognitive aspects of the network.

BRIEF DESCRIPTION OF THE DRAWINGS

FIG. 2b illustrates the exchange of transmissions of the network of FIG. 2a.

DETAILED DESCRIPTION OF THE PREFERRED EMBODIMENTS

Figure 1:
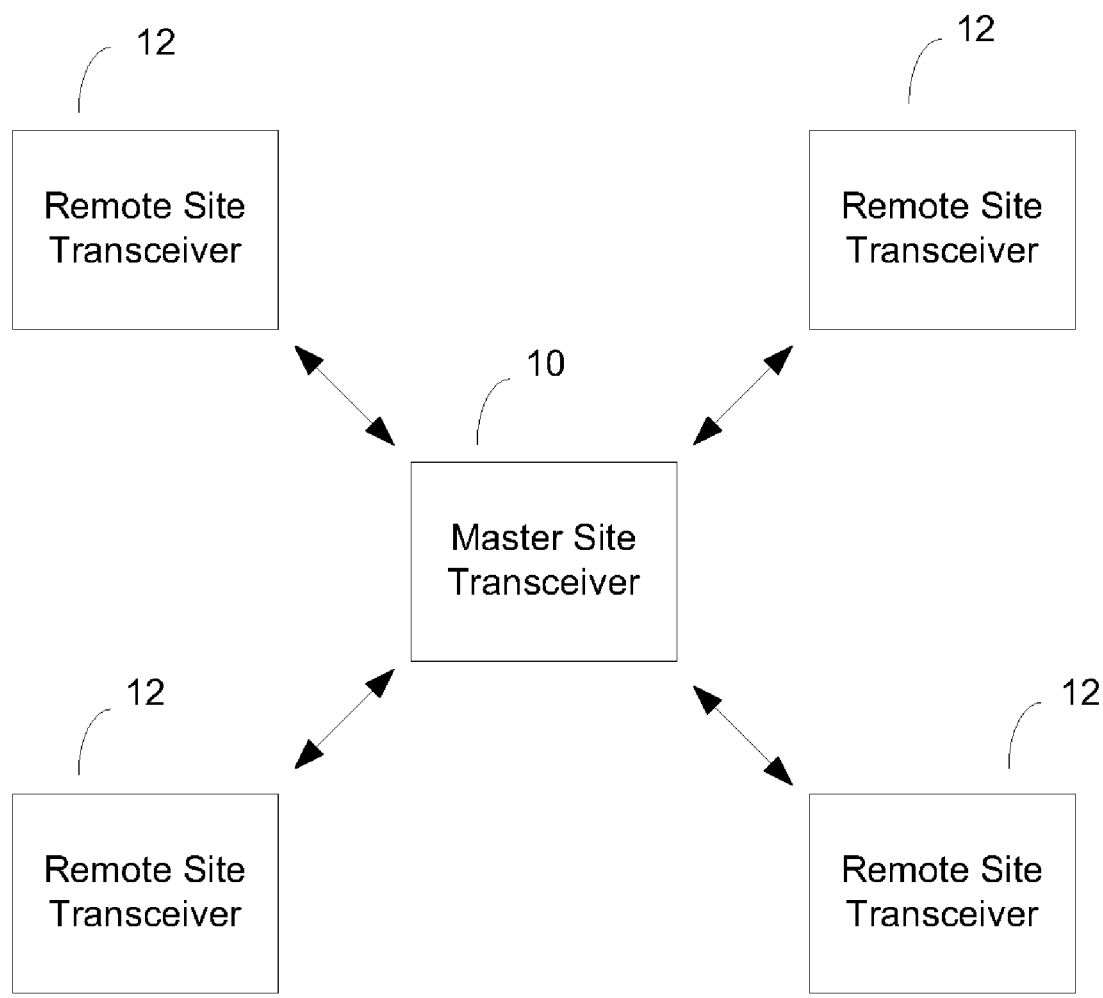
FIG. 1 diagrammatically illustrates the overall architecture of a communication network, respective terminal unit transceiver sites of which employ the spectral reuse transceiver of the invention disclosed in the above-referenced '753 application.

This invention essentially involves special cases of the sub-channel hopping control mechanism executed by the communications control processor of the spectral reuse transceiver of the type disclosed in the '124 and '753 applications. This involves the execution of one or more prescribed discriminators or sub-channel selection filters, so as to effectively reduce the receiving end of a transceiver link. As will be described, these filter functions are readily implemented by appropriately setting the configuration parameters used by the communications controller of the transceiver disclosed in the '753 application to control the operation of the transceiver. The architecture of the transceiver of the '753 application may remain unchanged, except as noted. As a consequence, the present invention has been illustrated in the drawings by diagrammatic illustrations which include a generalized network architecture diagram and a sub-channel subdivision diagram that show only those details that are pertinent to the invention, so as not to obscure the disclosure with details which will be readily apparent to one skilled in the art having the benefit of the description herein.

As pointed out above, an objective of the invention is to extend the reach of a network, particularly a cognitive network, as described in the '124 application by interconnecting one or more distant transceivers to the network through one or more intermediate transceivers in the network, each transceiver performing a repeater function for each of one or more respective distant transceivers. The operation and effect of these repeaters, including a simplex repeater and a duplex repeater, will be discussed individually below.

FIG. 1 graphically illustrates a spectral reuse transceiver of the type described in the '124 application, installed at a master site 10 which communicates with respective spectral reuse transceivers installed at a number of remote sites 12. Each spectral reuse transceiver operates with a selectively filtered form of 'slow' frequency hopping, moving only when a sub-channel with less interference becomes available, so as to avoid interfering with another transceiver.

For the purposes of extending the range of the network of the present invention, one or more transceivers in the network may be advantageously selected to reach distant transceivers that are out of the range of the network's base station.

Figure 2A:
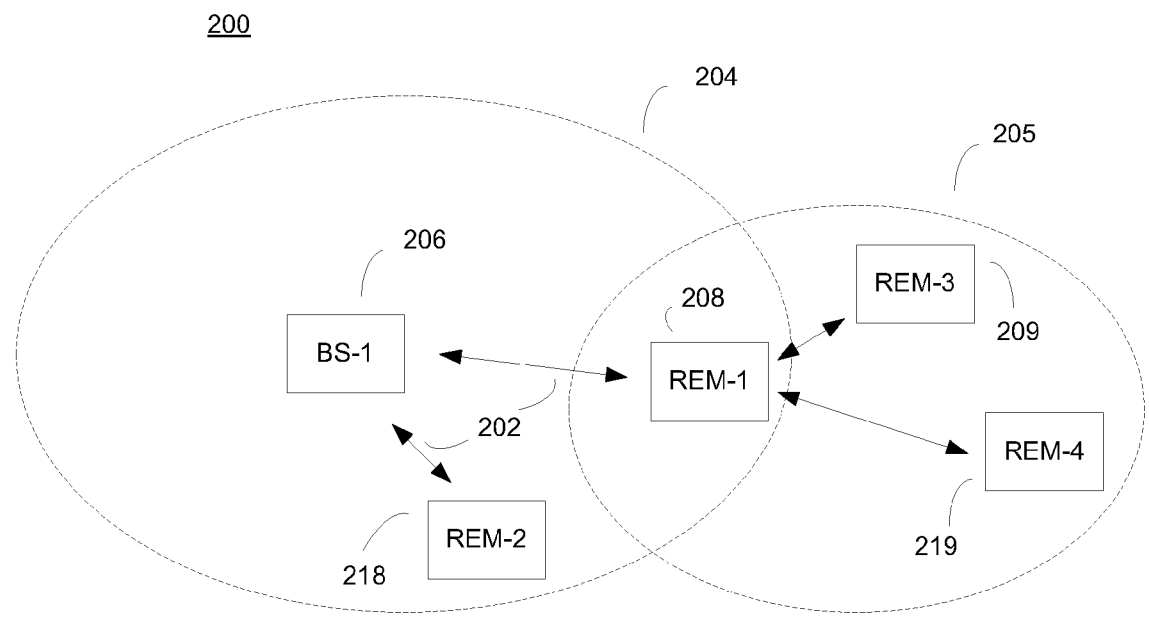
FIG. 2a graphically illustrates a cognitive network with simplex repeater comprising one network with a simplex repeater transceiver, and two far remote transceivers.
Figure 2B:
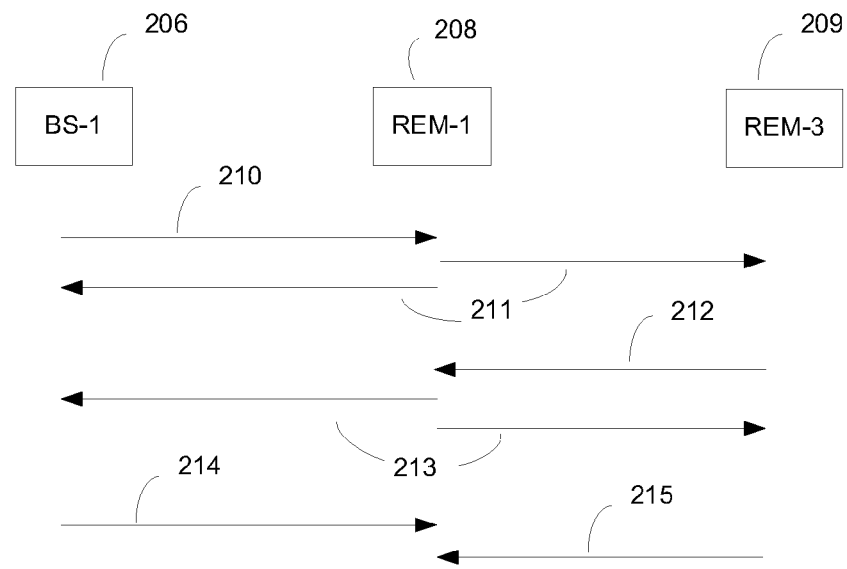

Referring to FIGS. 2a and 2b, which graphically illustrate a simplex repeating operation, a network 200 in FIG. 2a comprises a base station (BS-1) 206 with the non-limiting example of two remote stations REM-1 208 and REM-2 218 within radio coverage area 204 of base station 206. Remote REM-1 208 is further functioning as a simplex repeater, according to the present invention, extending network 200 radio coverage area 204 to include radio range 205 of remote REM-1 208. Radio coverage area 205 includes two far remotes REM-3 209 and REM-4 219, which are capable of communicating with remote REM-1 208. According to the present invention, messages received by simplex repeater REM-1 208 from base station BS-1 206 or from a far remote such as REM-3 209 are repeated on the same frequency, using the repeating rules described below, thereby advantageously extending the coverage area 204 of base station BS-1 206 to include the coverage area 205 of simplex repeater REM-1 208. Any one of remotes 208, 218, 209 219 may be configured to support simplex repeater functionality described herein.

All radios in network 200 cooperate to ensure that only one radio is transmitting at any instant, such cooperation including using radio media access methods such as poll/response, TDMA, and other access methods understood by persons skilled in the radio art.

FIG. 2b further illustrates the exchange of messages using the simplex repeater of the present invention. Base station BS-1 206 transmits a message 210 and that message is received by REM-1 208 operating as a simplex repeater according to the present invention. REM-1 208, according to simplex repeating rules, rebroadcasts message 210 as message 211. Message 211 is received by base station BS-1 206 and far remote REM-3 209, thereby extending the coverage area of base station BS-1 to include far remote REM-3. Note that as a result of the repeating of message 210 as message 211, base station BS-1 receives its own original message 210 in the form of repeated message 211.

According to one embodiment of the present invention, BS-1 would discard message 211. In another embodiment of the present invention, BS-1 will use message 211 as a positive acknowledgment of the receipt of message 210 by remote 208. In yet another embodiment of the present invention, REM-1 208 only repeats messages 210 if that message is a broadcast message or is addressed to or received from a far remote whose address or site ID is in a provided "repeat list" of approved far remote sites. In another embodiment of the present invention, the address is an IP address.

Similarly, a message 212 received from far remote REM-3 209 is received by REM-1 208 and is subsequently repeated by REM-1 in the form of message 213, message 213 being received by BS-1 206 and REM-3 209. In another embodiment of the present invention, REM-1 only repeats message 212 if that message is a broadcast message or is addressed to or received from a far remote whose address or site ID is NOT included in the "repeat list" of approved far remote sites. In another embodiment of the present invention, the address may be an IP address. In this instance, message 213 is 'new' for base station BS-1 206, and is a duplicate of message 212 for far remote REM-3. Upon receiving the repeated message 213, REM-3 may discard it or use it as a positive acknowledgment of the receipt of message 212 by REM-1.

Message 214 illustrates receipt of a message by REM-1, sent by BS-1 and addressed to a far remote that is not in remote REM-1's "repeat list" and is not a broadcast message. In this instance, REM-1 does not repeat message 214. Similarly, message 215 illustrates the example of a message received by REM-1 from a far remote (REM-3) that IS in REM-1's "repeat list" and is not a broadcast message. In this instance, however, REM-1 does not repeat message 215. The repeating rules for simplex operation allow the configuration of repeaters and remotes in IP networks to be changed by software without requiring changes to IP addresses, subnets, or masks. Also, the repeating rules permit the exchange of cognitive information, such as interference information, between base stations and all radios (including far remotes through their repeaters), thus extending the range of cognitive radio networks. This will enable, for example, the entire cognitive network, including far remotes, to move to a new frequency channel on command from the base station, including cognitively moving to a new frequency channel to mitigate against radio interference.

Figure 3:
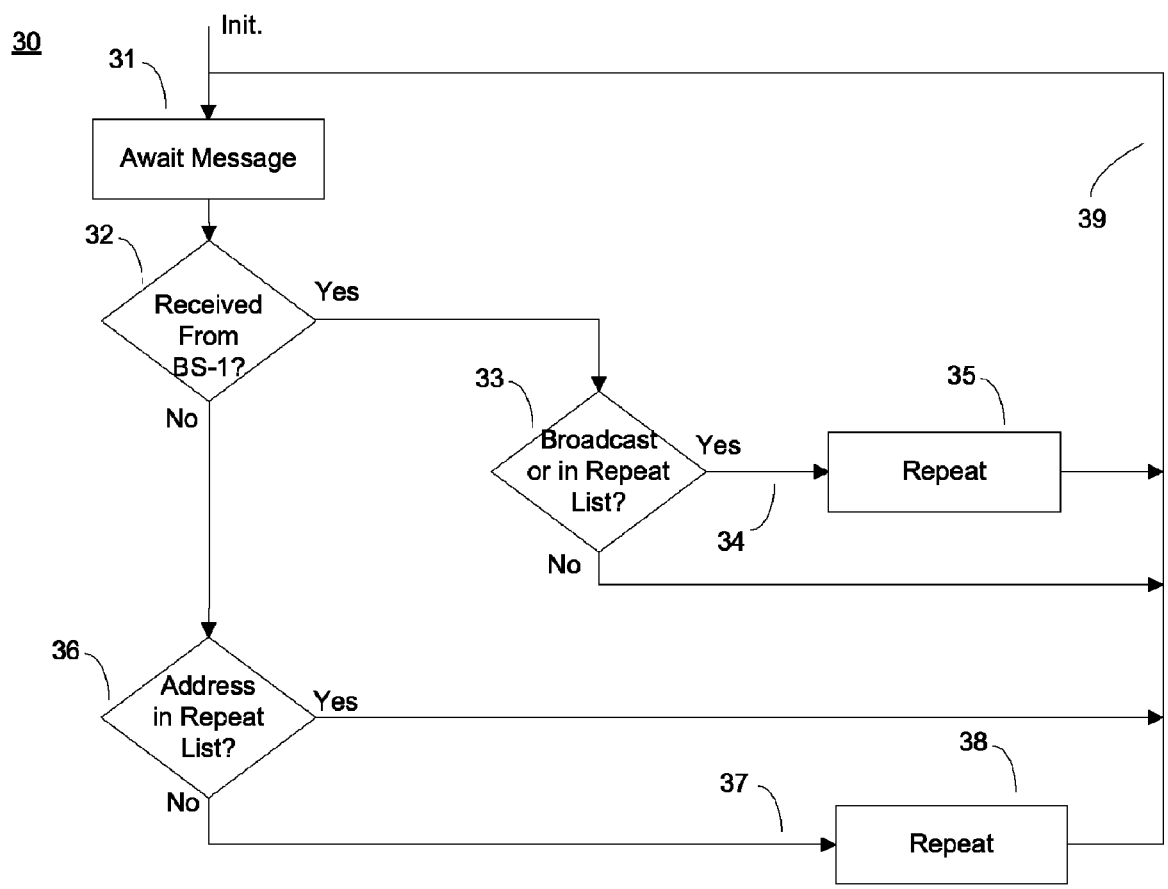
FIG. 3 is a flowchart of a routine for implementing the repeating of packets by a simplex repeater transceiver according to an embodiment of the present invention.

Referring now to FIG. 3, flowchart 30 further depicts the repeating rules described above. After an initialization period, a remote transceiver of the present invention waits at block 31 to receive a message from the base station or a far remote. When a message is received, decision block 32 determines whether the message was received from a base station or from a remote. If the message was received from a base station, program flow follows the "Yes" path whereby decision block 33 checks the received message's destination address. If the destination address is a broadcast message or, is in the remote transceiver's "repeat list" of transceivers, the "Yes" path is taken whereby the message is repeated at Repeat block 35; otherwise, decision block 33 returns to Await Message block 31 via return path 39.

Returning to decision block 32, if the message received is from a far remote (rather than from a base station), the "No" path is taken, whereby decision block 36 checks the receive message's destination address. If the destination address is not in the "repeat list" of far transceivers, the "Yes" path is taken whereby the message is repeated at Repeat block 38. This would be the case, for example, if the message is intended for base station BS-1, which is not located in a remote coverage area and therefore whose address would not appear in REM-1's repeat list. If the destination address is found in REM-1's repeat list, the message is not intended for BS-1, and decision block 33 returns program flow to Await Message block 31 via return path 39 without first repeating the message.

Figure 4A:
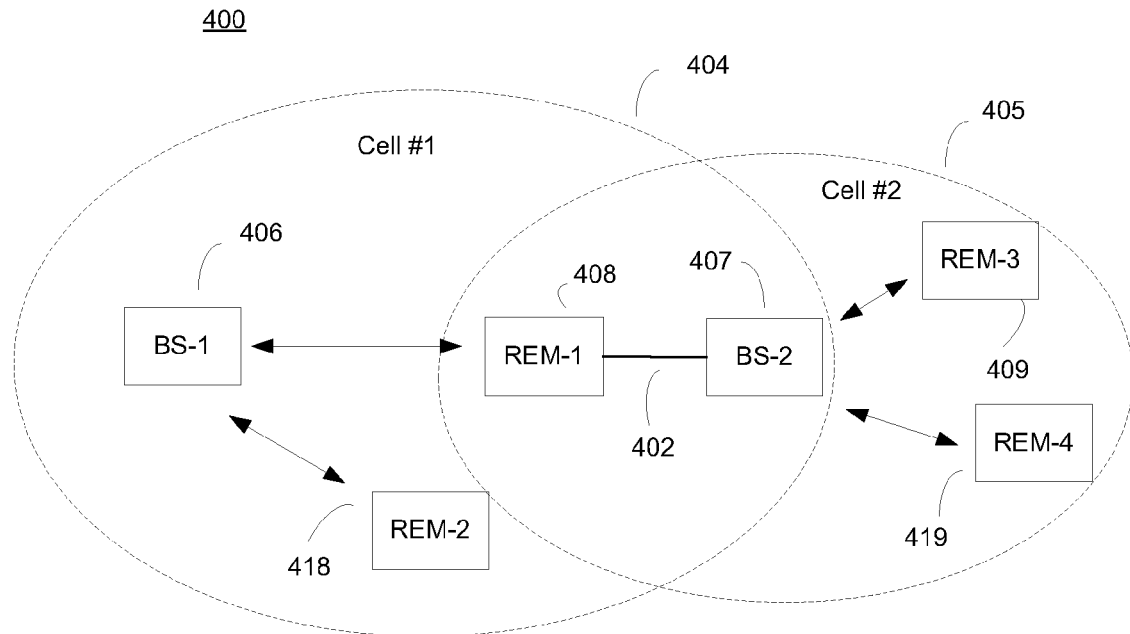
FIG. 4a graphically illustrates a cognitive network with duplex repeater comprising one network with a base station, duplex repeater transceiver, far base station, and a far remote transceiver.

FIG. 4a graphically illustrates a duplex repeating operation. A network 400 comprises the network of base station BS-1 406 with its associated remote stations REM-1 408 and REM-2 418, with REM-1 operating as a duplex repeater. The network also includes base station BS-2 407 with its associated remote stations REM-3 409 and REM-4 419, and an Ethernet cable 402 connecting REM-1 to BS-2. According to the present invention, messages received by duplex repeater REM-1 from base station BS-1 are sent over Ethernet connection 402 to base station BS-2 where the messages may be rebroadcast to remote stations REM-3 409 and REM-4 419. In this embodiment, the coverage area 404 of base station BS-1 has been extended to include the coverage area 405 of BS-2. Similarly, messages received by BS-2 from a remote 409 or 419 are sent over Ethernet connection 402 to base station duplex repeater REM-1 408, from which the messages may be retransmitted to base station BS-1. Any of remotes 408 or 418 of BS-1 may be configured to support the duplex repeater functionality described herein. The remote radios 408, 418 of the BS-1 network 404 may transmit independently of the remote radios 409, 419 of the BS-2 network 405.

Figure 4B:
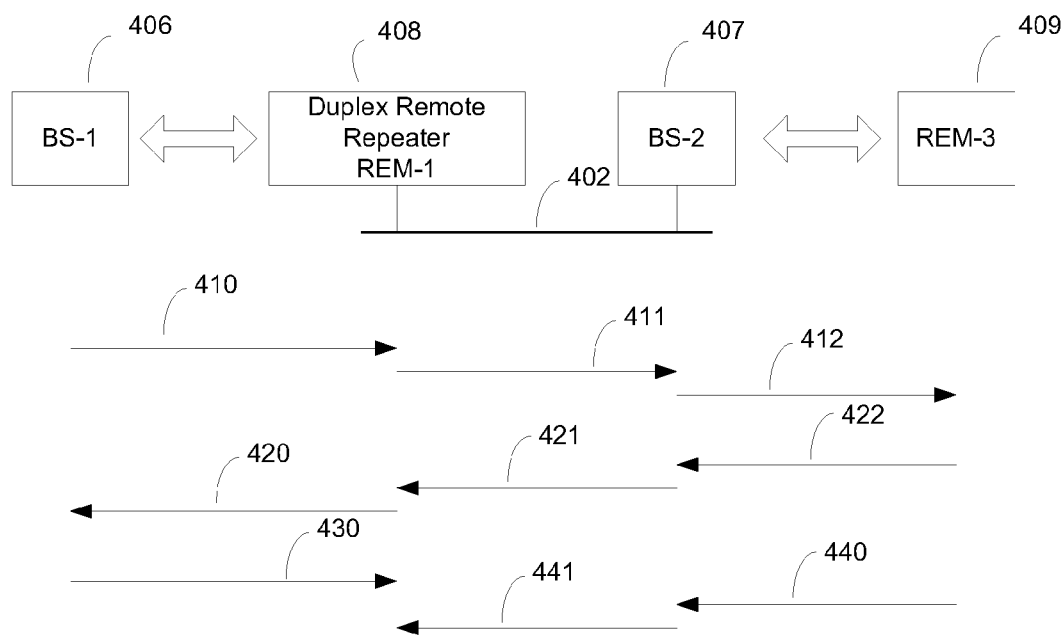
FIG. 4b illustrates the exchange of messages in a duplex transceiver configuration.

FIG. 4b further illustrates the exchange of messages using the duplex repeater of the present invention. Periodically, far base station BS-2 407 will send its routing table (for network 405 in FIG. 4a) over Ethernet cable 402 to remote REM-1 408. The routing table informs REM-1, which is acting as a duplex receiver and as the default gateway of far base station BS-2, of the presence of far remote transceivers REM-3 409 and any others (not shown) on the network 405 of BS-2. This routing technique allows fairly large networks to be aggregated without the need for large routing tables.

The two radio networks manage their physical layer transmit and receive operations independently, and can use their cognitive capabilities (described in the '124 application) to avoid interfering with each other. Base station BS-1 406 broadcasts message 410 which is received by REM-1 408 operating as a duplex repeater according to the present invention. REM-1 looks up the address of message 410 in the routing table and, if it finds a match, will send the message over Ethernet cable 402 as message 411 to far base station BS-2 407. BS-2 then broadcasts the message to all far radios 409, 419 on BS-2's network 405 as message 412.

Similarly, when a message 422 from far remote REM-3 409 is received by BS-2, BS-2 sends message 422 as message 421 over Ethernet connection 402 to REM-1 408, which is acting as a default gateway and duplex repeater for BS-2. REM-1 compares the address of message 421 to addresses in its routing table, and if it does NOT find a match, REM-1 sends message 421 over the air as message 420 to base station BS-1 406.

In another scenario, BS-1 406 broadcasts message 430 over the air where it is received by REM-1 acting as a duplex repeater for BS-2 407. In this example, the address of message 430 is NOT found in the routing table of REM-1, so REM-1 will not send message 430 to BS-2 via Ethernet cable 402. In yet another scenario, BS-2 receives message 440 from far remote REM-3 409. BS-2 subsequently sends message 440 as message 441 to REM-1 over Ethernet cable 402, REM-1 acting as the default gateway and duplex repeater for BS-2. In the present example, the address of message 441 (and message 440) IS found in the routing table of REM-1. Because addresses in REM-1's routing table pertain only to transceivers in BS-2's network 405, the message is not intended for BS-1, and REM-1 will not repeat message 441 for receipt by BS-1.

In another embodiment of the present invention, the address is an IP address. In the preferred embodiment, the testing of IP addresses in the routing table is done by the subnet and mask technique, which is well known to one skilled in the art. The described repeating (routing) technique allows the creation of fairly large networks of IP addresses without large routing tables. The two radio networks 404 and 405 manage their physical layer transmit and receive operations independently, and can use their cognitive capabilities to avoid interfering with each other.

Figure 5:
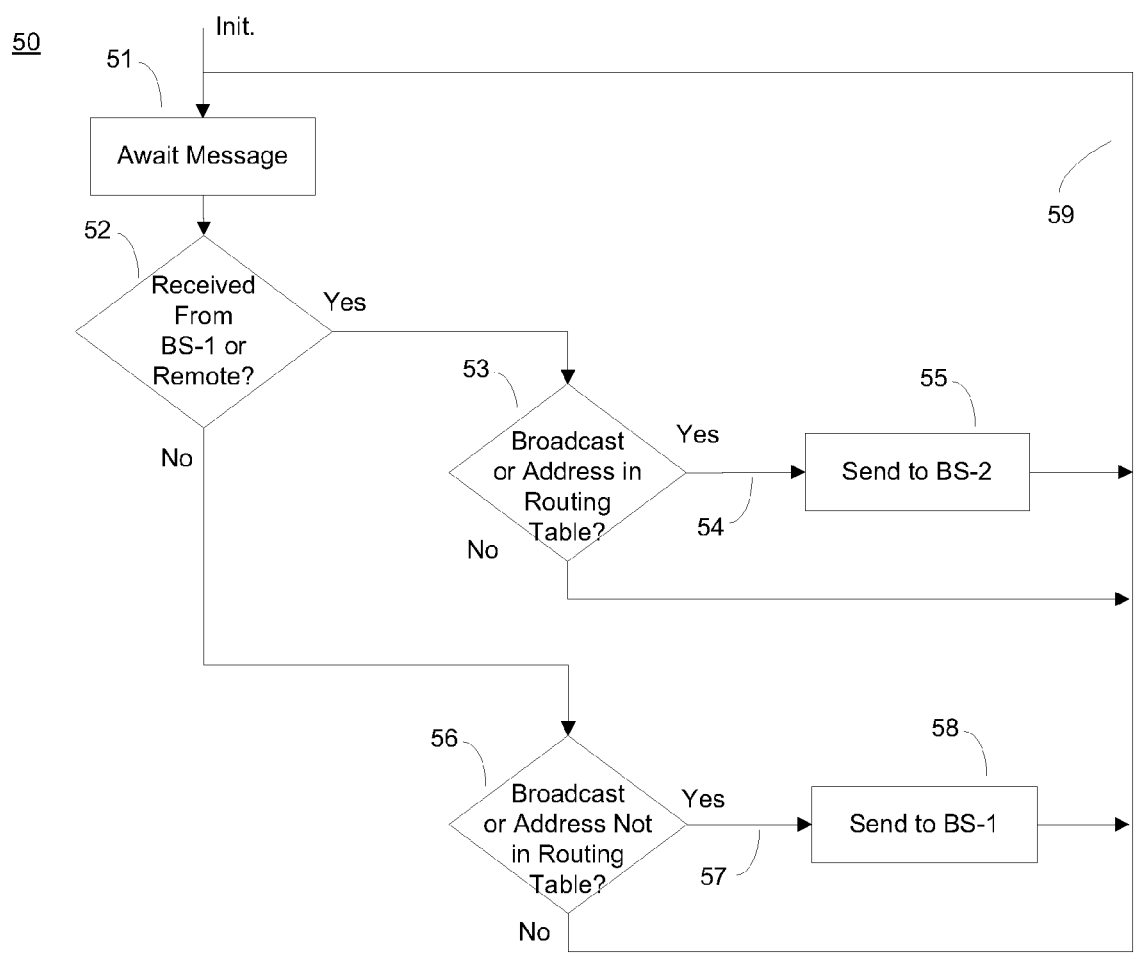
FIG. 5 is a flowchart of a routine for implementing the repeating of packets by a duplex repeater transceiver according to an embodiment of the present invention.

Referring next to FIG. 5, flowchart 50 further describes the repeating rules of the duplex repeater described above in the descriptions of FIGS. 4a and 4b. In FIG. 5, after an initialization period, a remote transceiver acting as a duplex repeater of the present invention waits at block 51 to receive a message from the base station (over the air) or from the far base station (over the Ethernet cable). When a message is received, decision block 52 tests the message source. If the message was received from the base station, the "Yes" path 510 is taken to decision block 53, where the message address is tested. If the message received has a broadcast address or is in the remote's routing table, the "Yes" path 54 is taken whereby the message is repeated by Repeat block 55 over an Ethernet cable to the far base station. Otherwise, decision block 53 returns to Await Message block 51. Returning now to decision block 52, if the message received is from BS-2 over the Ethernet cable, the "No" path is taken to block 56, whereby decision block 56 tests the receive message's destination address. If the destination address is found in the route list of far transceivers or is a broadcast message, the message is not intended for network 404, and the "No" path is taken whereby program flow returns to decision block 56 via return path 59 to Await Message block 51. Otherwise, the message is intended for network 404 and is repeated by Repeat block 58 by transmitting the message over the air to BS-1

The example of the Ethernet cable of FIGS. 4a and 4b, and the descriptions of FIGS. 4a, 4b and 5 are not limiting. Asynchronous communications over serial ports and other serial communications methods known to one skilled in the art are anticipated by the present invention. Similarly, the addressing of FIGS. 2a, 2b, 3, 4a, 4b, and 5 are not limited to IP address. Various routing address schemes known to one skilled in the art, such as IPX, and the various SCADA protocols, are able to be used by the present invention.

While we have shown and described several embodiments in accordance with the present invention, it is to be understood that the same is not limited thereto but is susceptible to numerous changes and modifications as would be known to persons skilled in the art, and there is no intention that this application be so limited, but it is intended to cover all such changes and modifications as are obvious to one of ordinary skill in the art. For example, the transceivers described in the above-identified '753 application may, without limitation, operate in a star network. Radio links between transceivers in other topologies, such as point-to-point, and individual links in mesh networks, as examples, can employ the cost-reduction and other improvements of the present invention.

What is claimed is:

1. On a wireless radio network comprising a plurality of transceivers of which at least one transceiver is a base station and at least one transceiver is configured as a simplex repeater, a method of repeating wireless messages comprising the steps of:
    (a) said simplex repeater waiting for an incoming message;
    (b) said simplex repeater receiving an incoming message;
    (c) determining whether the source of said message is a base station;
    (d) if said source is a base station, determining whether said message is a broadcast message or has a destination address found in a repeat list of addresses, and
        if said message is a broadcast message or has an address found in said repeat list, repeating said message and returning to step (a), and
        otherwise, returning to step (a) without repeating said message; and
    (e) if said source is not a base station, determining whether said destination address of said message is found in said repeat list, and
        if said message has an address found in said repeat list, returning to step (a) without repeating said message, and
        otherwise, repeating said message and returning to step (a).

2. The method of claim 1 wherein said transceivers are cognitive radios.

3. The method of claim 2 wherein cognitive network information is exchanged between said far remote transceivers and said simplex repeater.

4. The method of claim 1 wherein said plurality of transceivers comprises one or more far remote transceivers located outside the coverage area of said base station and within the coverage area of said at least one simplex repeater, and said repeat list includes addresses of said far remote receivers.

5. The method of claim 4 wherein said message is an IP message.

6. The method of claim 4 wherein said message is a SCADA message.

7. On one or more wireless radio networks comprising a plurality of transceivers of which one transceiver is a first base station, one transceiver is a second base station, and at least one transceiver is configured as a duplex repeater connected to said second base station, a method of repeating wireless messages comprising the steps of:
    (a) said duplex repeater receiving and maintaining a routing table provided by said second base station;
    (b) said duplex repeater waiting for an incoming message;
    (c) said duplex repeater receiving an incoming message;
    (d) determining whether the source of said message is said first base station;
    (e) if said source is said first base station, determining whether said message is a broadcast message or has a destination address found in said routing table, and if said message is a broadcast message or has an address found in said routing table, sending said message to said second base station and returning to step (b), and otherwise, returning to step (b) without sending said message to said second base station;

(f) and if said source is not said first base station, determining whether said destination address of said message is found in said routing table, and if said message has an address found in said routing table, returning to step (b) without repeating said message, and if said destination of said message is not found in said routing table, repeating said message and returning to step (b).

8. The method of claim 7 wherein said transceivers are cognitive radios.

9. The method of claim 7 wherein said one or more wireless radio networks further comprises at least first and second independent wireless radio networks, said first network being controlled by said first base station and having a first plurality of remote transceivers, said second network being controlled by said second base station and having a second plurality of remote transceivers, and said routing table including the addresses of said second plurality of remote transceivers.

10. The method of claim 9 wherein said message is an IP message.

11. The method of claim 9 wherein said message is a SCADA message.

12. The method of claim 9 wherein cognitive network information is exchanged between said first and second networks.

13. A wireless radio network comprising:
a plurality of transceivers of which at least one transceiver is a base station, at least one transceiver is configured as a simplex repeater and is situated within the coverage area of said base station, and one or more transceivers are far remote transceivers located outside the coverage area of said base station and within the coverage area of said simplex repeater, said simplex repeater having and maintaining a repeat list of addresses, and being configured to receive an incoming message and determine the source of said message and whether said message is a broadcast message;

and if the source of said message is said base station and said message is a broadcast message, to repeat said message;

and if the source of said message is said base station and said message is not a broadcast message, to determine whether the destination address of said message is listed in said repeat list of addresses maintained by said simplex repeater;

and if said address is listed in said repeat list, to repeat said message;

and if said address is not listed in said repeat list, to discard said message;

and if said source is not said base station, to determine whether said destination address of said message is listed in a repeat list of addresses maintained by said simplex repeater, and if said address is listed in said repeat list, to discard said message;

and if said address is not listed in said repeat list, to repeat said message.

14. The wireless radio network of claim 13 wherein said transceivers are cognitive radios.

15. The wireless radio network of claim 14 wherein said repeat list comprises addresses of far remote transceivers located outside the coverage area of said base station and within the coverage area of said simplex repeater.

16. The wireless radio network radio of claim 15 wherein said message is an IP message.

17. The wireless radio network of claim 15 wherein said message is a SCADA message.

18. The wireless radio network of claim 14 wherein cognitive network information is exchanged between said far remote transceivers and said simplex repeater.

19. A wireless radio network comprising:
first and second wireless subnetworks, each said subnetwork comprising a plurality of transceivers, said first subnetwork comprising a first base station and at least one transceiver configured as a duplex repeater, said second subnetwork comprising a second base station and one or more remote transceivers, said second base station being in electronic communication with said duplex repeater and providing said duplex repeater with a routing table;

said configuration of said duplex repeater causing said duplex repeater to receive an incoming message;

and if the source of said message is said first base station and said message is a broadcast message, to repeat said message;

and if the source of said message is said first base station and said message is not a broadcast message, to determine whether the destination address of said message is found in said routing table, and if said address is found in said routing table, to repeat said message;

and if said address is not listed in said routing table, to discard said message;

and if said source is not said first base station, to determine whether said destination address of said message is listed in said routing table, and if said address is not listed in said routing table, to repeat said message;

and if said address is listed in said routing table, to discard said message.

20. The wireless radio network of claim 19 wherein said transceivers are cognitive radios.

21. The wireless radio network of claim 20 wherein said routing table comprises addresses of remote transceivers within said second subnetwork.

22. The wireless radio network of claim 21 wherein said message is an IP message.

23. The wireless radio network of claim 21 wherein said message is a SCADA message.

24. The wireless radio network of claim 21 wherein cognitive network information is exchanged between said first and second subnetworks.

* * * * *